US012726868B2

(12) United States Patent
Panchal et al.

(10) Patent No.: US 12,726,868 B2
(45) Date of Patent: Sep. 1, 2026

(54) SEAMLESS CONNECTIVITY USING LICENSED AND UNLICENSED WIRELESS SPECTRUM BANDWIDTH

(71) Applicant: Charter Communications Operating, LLC, St. Louis, MO (US)

(72) Inventors: Pareshkumar Panchal, Highlands Ranch, CO (US); Muhib Taiye Oduwaiye, Aurora, CO (US)

(73) Assignee: Charter Communications Operating, LLC, St. Louis, MO (US)

( * ) Notice: Subject to any disclaimer, the term of this patent is extended or adjusted under 35 U.S.C. 154(b) by 386 days.

(21) Appl. No.: 18/490,183

(22) Filed: Oct. 19, 2023

(65) Prior Publication Data

US 2025/0133460 A1 Apr. 24, 2025

(51) Int. Cl.

*H04W 36/08* (2009.01)
*H04W 16/14* (2009.01)
*H04W 36/30* (2009.01)
*H04W 36/36* (2009.01)

(52) U.S. Cl.

CPC ........... *H04W 36/08* (2013.01); *H04W 16/14* (2013.01); *H04W 36/302* (2023.05); *H04W 36/36* (2013.01)

(58) Field of Classification Search

CPC ... H04W 36/08; H04W 16/14; H04W 36/302; H04W 36/0085; H04W 72/23; H04W 24/10; H04W 36/36

See application file for complete search history.

(56) References Cited

U.S. PATENT DOCUMENTS 9,585,068 B2 * 2/2017 Tabet ................ H04W 36/0085
2017/0070904 A1 * 3/2017 Mali ..................... H04W 72/23
2017/0331600 A1 * 11/2017 bin Samingan ....... H04W 24/10

* cited by examiner

*Primary Examiner* — Vinncelas Louis

(74) *Attorney, Agent, or Firm* — Mendelsohn Dunleavy, P.C.; Steve Mendelsohn

(57) ABSTRACT

In wireless communications, an uplink imbalance can exist for a wireless device (e.g., a cell phone), where the uplink signal strength is insufficient for reliable uplink transmissions from the wireless device to the serving node (e.g., 4G/5G base station or Wi-Fi access point) even though the downlink signal strength is sufficient for reliable downlink transmissions from the serving node to the wireless device. In one implementation, the wireless device detects an uplink imbalance based on missing downlink ACK messages from the serving node in response to its periodic uplink measurement reports to the serving node. In another implementation, the network (e.g., the serving node) detects an uplink imbalance based on missing uplink measurement reports from the wireless device. In either case, the detection of an uplink imbalance triggers initiation of handover processing to a neighbor node having sufficient signal strength.

8 Claims, 4 Drawing Sheets

100
130
136
BACK
END
SERVERS
132
BASE
STATION
CONTROLLER
134
ACCESS
POINT
CONTROLLER
110
BS
110
BS
110
BS
120
AP
120
AP
120
AP

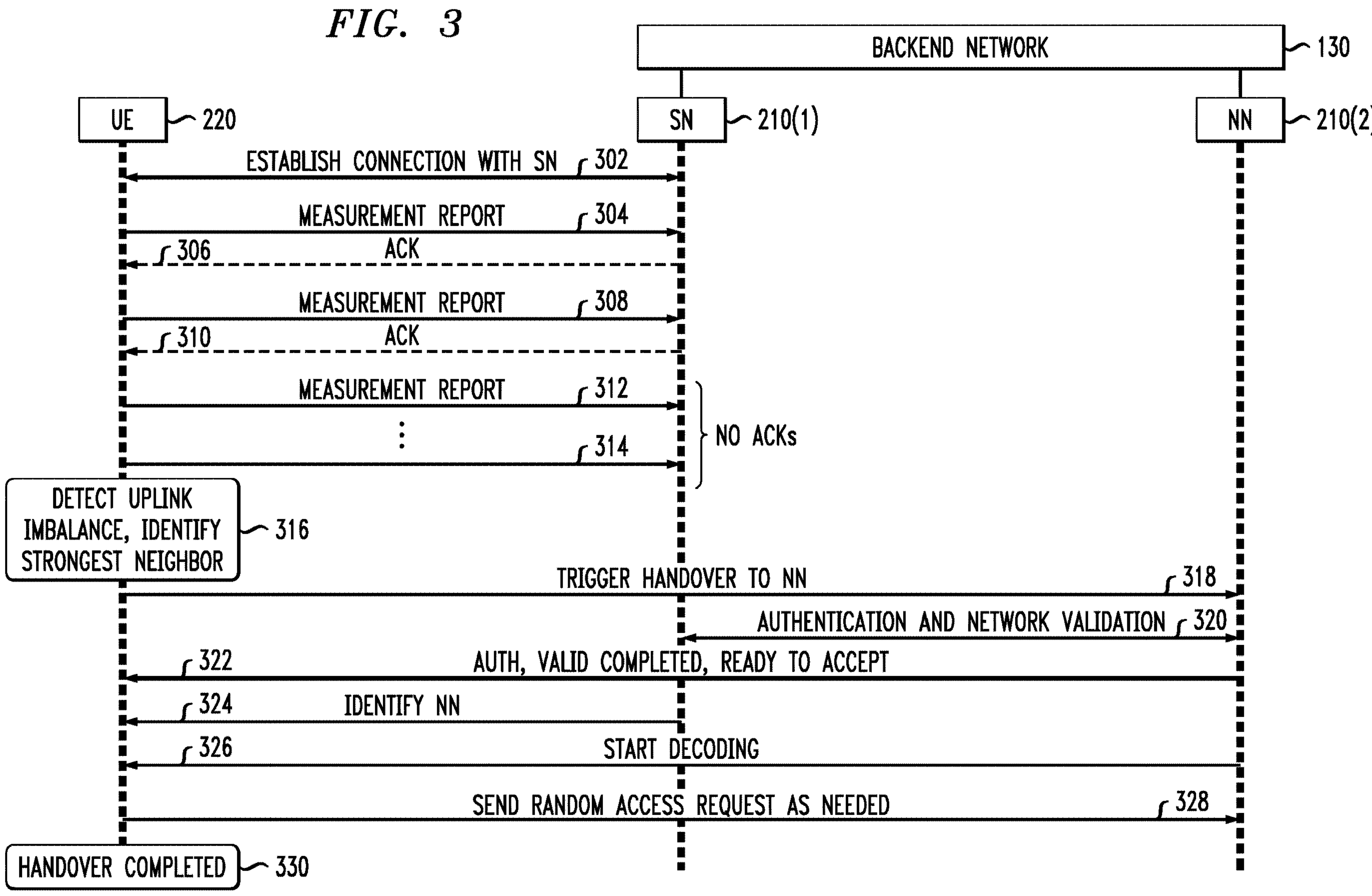
FIG. 3
BACKEND NETWORK
130
UE
220
SN
210(1)
NN
210(2)
ESTABLISH CONNECTION WITH SN
302
MEASUREMENT REPORT
304
306
ACK
MEASUREMENT REPORT
308
310
ACK
MEASUREMENT REPORT
312
⋮
314
NO ACKs
DETECT UPLINK IMBALANCE, IDENTIFY STRONGEST NEIGHBOR
316
TRIGGER HANDOVER TO NN
318
AUTHENTICATION AND NETWORK VALIDATION
320
322
AUTH, VALID COMPLETED, READY TO ACCEPT
324
IDENTIFY NN
326
START DECODING
SEND RANDOM ACCESS REQUEST AS NEEDED
328
HANDOVER COMPLETED
330

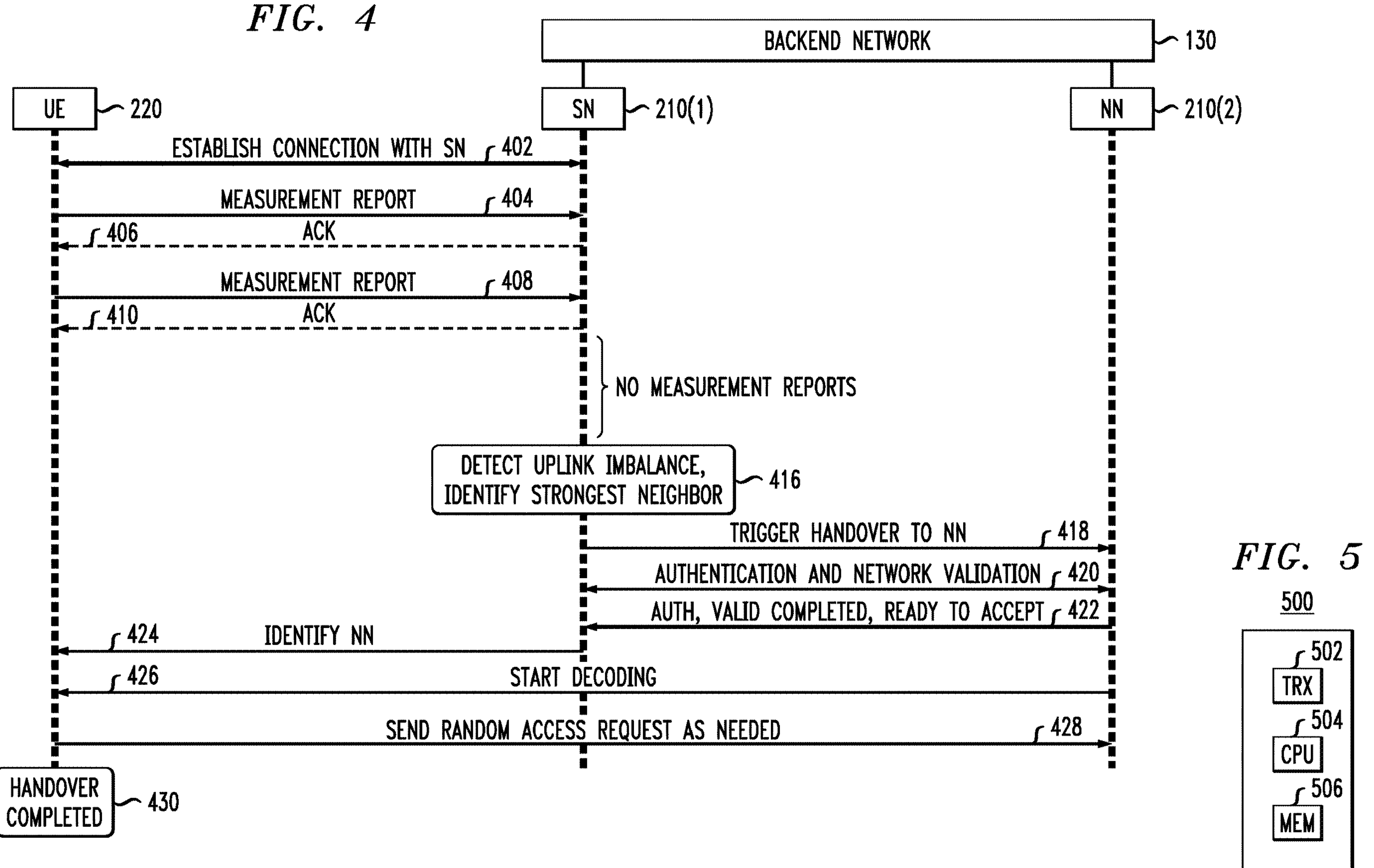
FIG. 4
BACKEND NETWORK
130
UE
220
SN
210(1)
NN
210(2)
ESTABLISH CONNECTION WITH SN
402
MEASUREMENT REPORT
404
ACK
406
MEASUREMENT REPORT
408
ACK
410
NO MEASUREMENT REPORTS
DETECT UPLINK IMBALANCE, IDENTIFY STRONGEST NEIGHBOR
416
TRIGGER HANDOVER TO NN
418
AUTHENTICATION AND NETWORK VALIDATION
420
AUTH, VALID COMPLETED, READY TO ACCEPT
422
IDENTIFY NN
424
START DECODING
426
SEND RANDOM ACCESS REQUEST AS NEEDED
428
HANDOVER COMPLETED
430
FIG. 5
500
TRX
502
CPU
504
MEM
506

SEAMLESS CONNECTIVITY USING LICENSED AND UNLICENSED WIRELESS SPECTRUM BANDWIDTH

BACKGROUND

Field of the Disclosure

The present disclosure relates to wireless communications and, more specifically but not exclusively, to wireless devices transitioning between different access nodes, such as, for example, 4G/5G base stations and/or Wi-Fi access points.

Description of the Related Art

This section introduces aspects that may help facilitate a better understanding of the disclosure. Accordingly, the statements of this section are to be read in this light and are not to be understood as admissions about what is prior art or what is not prior art.

It is known for a 4G/5G wireless service provider (i.e., network operator) to deploy different base stations over a geographic region, where each base station employs bandwidth within a wireless communications spectrum licensed by the service provider to communicate with wireless user equipment (UEs), such as cell phones, of subscribers to the service provider. As a subscriber moves with their UE from the coverage area of the current, serving base station to the (overlapping) coverage area of a neighbor base station, the UE's connection with the serving base station is handed off to the neighbor base station, with each base station using licensed bandwidth within the wireless communications spectrum to communicate with the UE. The determination as to when to transition from the serving base station to the neighbor base station is based on the received signal strengths (RSSs) of the downstream signals from the serving and neighbor base stations as measured at the UE. When the RSS for the neighbor base station is sufficiently greater than the RSS for the serving base station, the decision is made at the serving base station to transition the UE from the serving base station to the neighbor base station, which will then become the new serving base station.

SUMMARY

In some wireless communication systems, the downlink signals transmitted from the serving node (e.g., a 4G/5G base station or a Wi-Fi access point) to a UE may be stronger than the uplink signals from the UE to the serving node. As a result, the downlink coverage area (i.e., the geographic area within which the UE can reliably receive and successfully process downlink signals from the serving node) may be larger than the uplink coverage area (i.e., the geographic area within which the serving node can reliably receive and successfully process uplink signals from the UE). When a UE is at a location that is within the downlink coverage area of the serving node, but outside the serving node's uplink coverage area, an uplink imbalance condition is said to exist for the UE, where the serving node might not be able to receive and successfully process uplink signals from the UE, even though the UE is able to receive and successfully process downlink signals from the serving node. In those situations, communications between the UE and serving node may be unreliable.

Furthermore, basing handover decisions solely on measured downlink signal strengths might not be the most-efficient way to determine when to transition from the serving node to a neighbor node. In particular, if an uplink imbalance exists, but the measured downlink signal strength from the serving node is greater than the measured downlink signal strength from a neighbor node, then, according to the existing technology, the UE will not transition from the serving node to the neighbor node or a handover to the neighbor node will fail due to the uplink imbalance, even if communications with the neighbor node would be more reliable than communications with the serving node.

According to certain embodiments of the present disclosure, as a subscriber to a wireless service provider moves within the geographic region covered by the service provider's communication network, a decision is made to transition the subscriber's UE from the serving node to a neighbor node based on a determination that the UE is currently operating in an uplink imbalance condition. When an uplink imbalance is determined to exist for a UE (where, depending on the implementation, that determination is made either by the UE or by the service provider's communication network), a decision is made to transition the UE from the serving node to a neighbor node (if any) that has sufficient signal strength to take over communications with the UE. Depending on the particular situation, the serving node may be a licensed or unlicensed access node (e.g., a 4G/5G base station or a Wi-Fi access point), and the neighbor node may likewise be a different, nearby, licensed or unlicensed access node.

BRIEF DESCRIPTION OF THE DRAWINGS

Embodiments of the disclosure will become more fully apparent from the following detailed description, the appended claims, and the accompanying drawings in which like reference numerals identify similar or identical elements.

FIG. 3 is a message flow diagram representing a scenario in which the UE of FIG. 2 determines that it has an uplink imbalance with respect to the serving node and initiates a transition to the neighbor node;

FIG. 4 is a message flow diagram representing a scenario in which (i) the comm network determines that the UE has an uplink imbalance with respect to the serving node and (ii) the comm network initiates a transition to the neighbor node; and FIG. 5 is a simplified hardware block diagram of an example element that can be used to implement any of the elements of FIGS. 1-4 including the UE and the access nodes.

DETAILED DESCRIPTION

Detailed illustrative embodiments of the present disclosure are disclosed herein. However, specific structural and functional details disclosed herein are merely representative for purposes of describing example embodiments of the present disclosure. The present disclosure may be embodied in many alternate forms and should not be construed as limited to only the embodiments set forth herein. Further, the terminology used herein is for the purpose of describing particular embodiments only and is not intended to be limiting of example embodiments of the disclosure.

As used herein, the singular forms "a," "an," and "the," are intended to include the plural forms as well, unless the context clearly indicates otherwise. It further will be understood that the terms "comprises," "comprising," "contains," "containing," "includes," and/or "including," specify the presence of stated features, steps, or components, but do not preclude the presence or addition of one or more other features, steps, or components. It also should be noted that in some alternative implementations, the functions/acts noted may occur out of the order noted in the figures. For example, two figures shown in succession may in fact be executed substantially concurrently or may sometimes be executed in the reverse order, depending upon the functions/acts involved.

Figure 1:
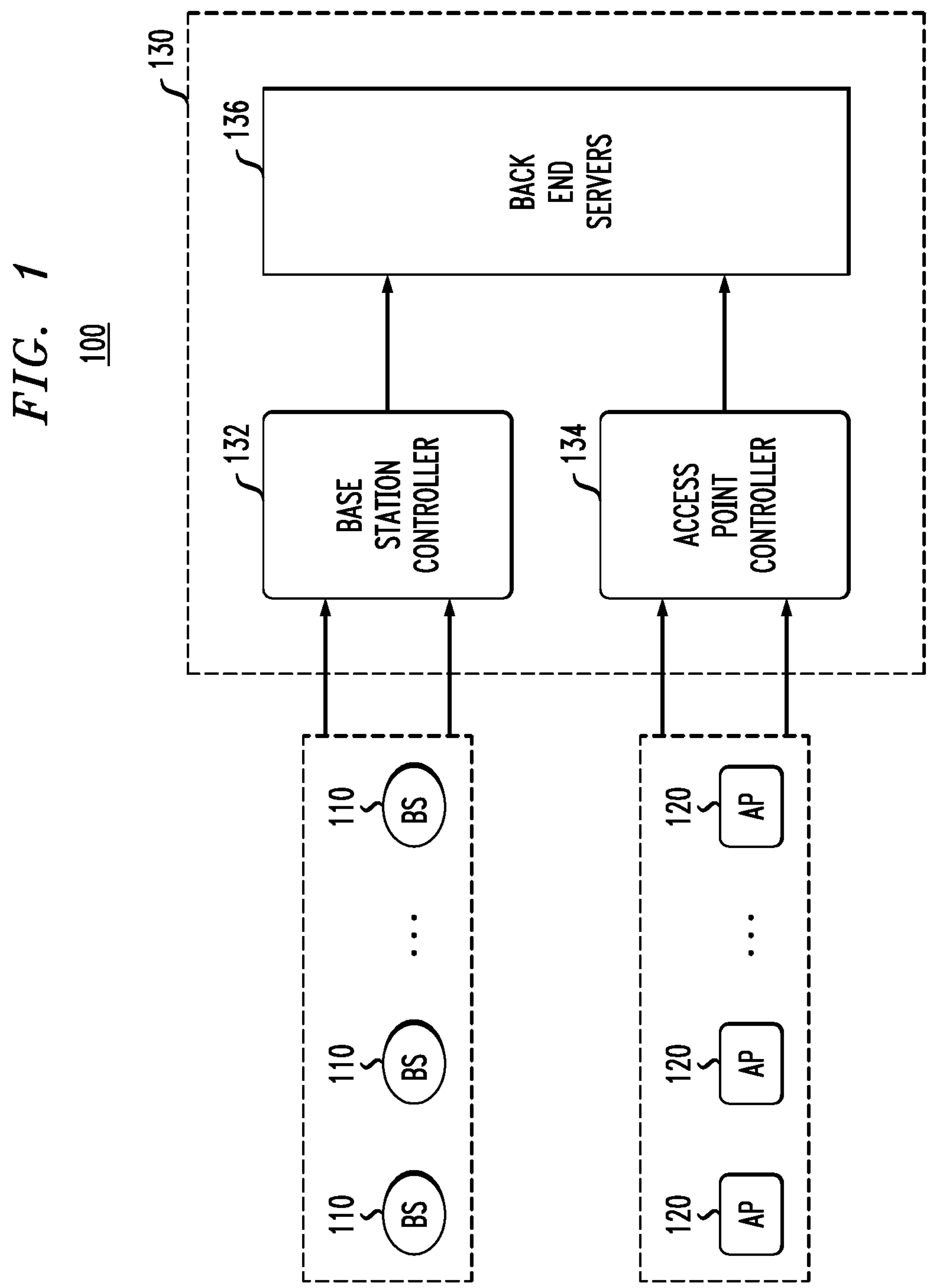
FIG. 1 is a simplified block diagram representing a service provider's communication network, according to certain embodiments of the disclosure.

FIG. 1 is a simplified block diagram representing a service provider's communication (comm) network 100, according to certain embodiments of the disclosure. As shown in FIG. 1, the comm network 100 comprises a set of one or more 4G/5G base stations (BSs) 110 and a set of one or more Wi-Fi access points (APs) 120, where (i) a base station controller 132 controls the operations of the base stations 110 and (ii) an access point controller 134 controls the operations of the access points 120. In addition, a set of one or more backend servers 136 provide overall management of the entire network 100 including communications between the BS and AP controllers 132 and 134. The BS and AP controllers 132 and 134 and the backend servers 136 may be said to form the backend network 130 for the service provider. Note that FIG. 1 does not represent the relative physical locations of the base stations 110 and the access points 134, only their logical relationships.

As used herein, the term "access node" refers generically to base stations and access points. Thus, the 4G/5G base stations 110 and the Wi-Fi access points of FIG. 1 are all access nodes. The term "serving node" refers to the access node that is currently supporting the communications of a particular UE, while the term "neighbor node" refers to an access node that is nearby the serving node such that the two access nodes have overlapping coverage areas.

As user herein, the term "licensed node" refers to a service provider's access node that is currently communicating or is capable of communicating with one or more UEs using bandwidth within a wireless communications spectrum that has been licensed by a regulatory authority at great cost to the service provider in a spectrum auction with other service providers. The term "unlicensed node" refers to a service provider's access node that is currently communicating or is capable of communicating with one or more UEs using bandwidth that has not been licensed by the regulatory authority. In general, licensed bandwidth is bandwidth that is available for use only by the service provider that licenses that bandwidth, while unlicensed bandwidth is available to multiple service providers, for example, on a first-come, first-served basis. Note that, at any given time, a particular access node may be a licensed node with respect to one or more UEs and an unlicensed node with respect to one or more other UEs.

In one possible implementation, the base stations 110 of FIG. 1 are 4G/5G base stations that communicate with subscriber UEs using portions of the Citizens Broadband Radio Service (CBRS) spectrum, where licensed 4G/5G base stations 110 communicate with subscriber UEs using licensed portions of the CBRS spectrum, unlicensed 4G/5G base stations 110 communicate with subscriber UEs using unlicensed portions of the CBRS spectrum, and unlicensed Wi-Fi access points 120 communicate with subscriber UEs using unlicensed, Wi-Fi bandwidth that is outside of the CBRS spectrum.

Figure 2:
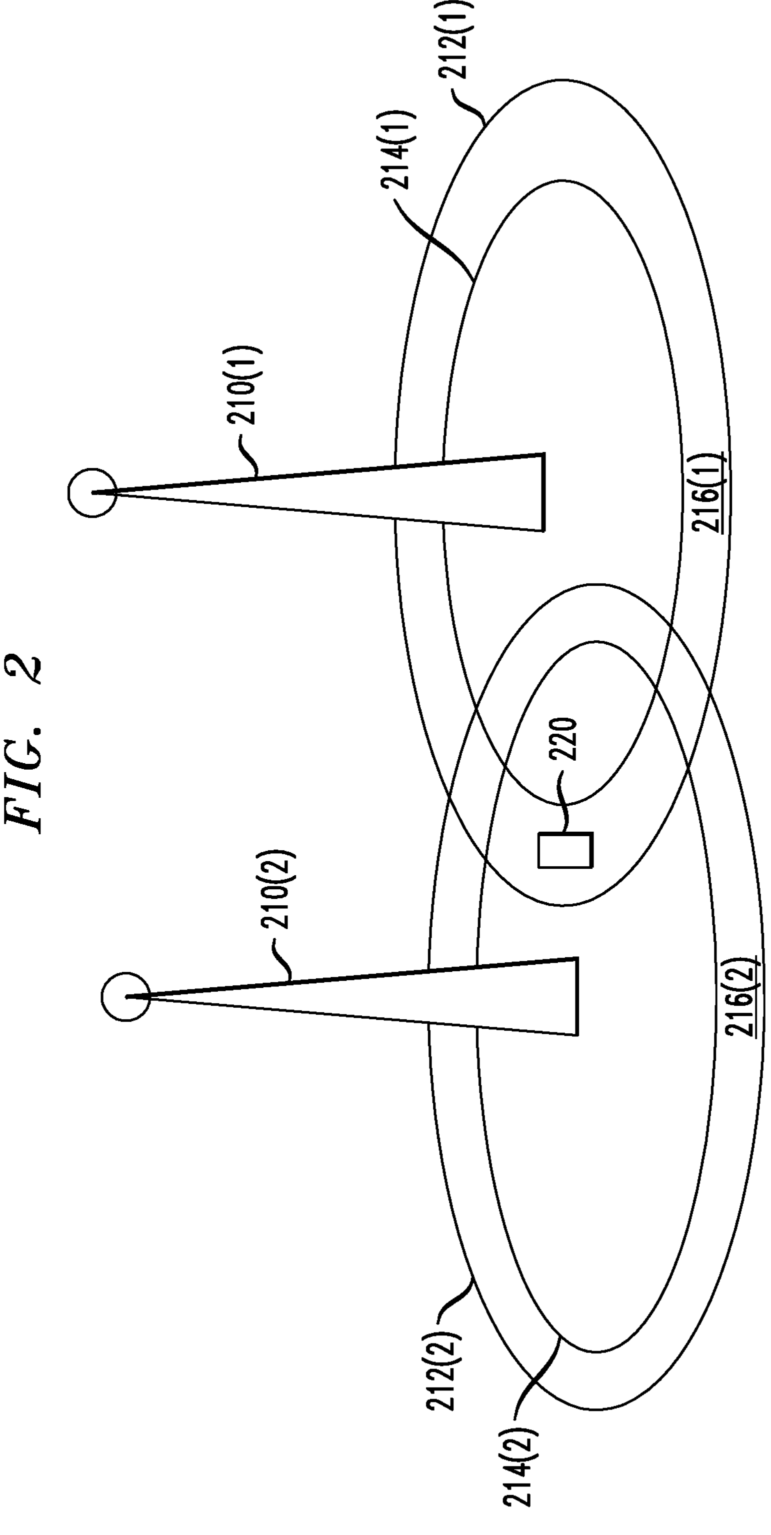
FIG. 2 is a schematic diagram representing a situation in which a UE is in an uplink imbalance condition with respect to its serving node.

FIG. 2 is a schematic diagram representing a situation in which a UE 220 is in an uplink imbalance condition with respect to its serving node 210(1). In particular, the UE 220 is located within the downlink coverage area 212(1) of the serving node 210(1), but outside the serving node's uplink coverage area 214(1). Note that the UE 220 is also located within both the downlink and uplink coverage areas 212(2) and 214(2) of the neighbor node 210(2). The situation represented in FIG. 2 may result from the UE 220 moving away from the serving node 210(1) and towards the neighbor node 210(2).

In the situation shown in FIG. 2, depending on the implementation, either the UE 220 or the comm network (e.g., the serving node 210(1)) will detect the uplink imbalance for the UE 220 and initiate a transition for the UE 220 from communicating with the serving node 210(1) to communicating with the neighbor node 210(2), where both access nodes 210(1) and 210(2) are part of the comm network 100 of FIG. 1.

Depending on the particular situation, each access node 210(*i*) of FIG. 2 may independently be (i) a licensed base station 110 of FIG. 1, (ii) an unlicensed base station 110 of FIG. 1, or (iii) an unlicensed access point 120 of FIG. 1. Thus, FIG. 2 represents nine different possible types of transition scenarios for the UE 220:

- Transitions from a licensed, serving base station 210(1) to a licensed, neighbor base station 210(2);
- Transitions from a licensed, serving base station 210(1) to an unlicensed, neighbor base station 210(2);
- Transitions from a licensed, serving base station 210(1) to an unlicensed, neighbor access point 210(2);
- Transitions from an unlicensed, serving base station 210(1) to a licensed, neighbor base station 210(2);
- Transitions from an unlicensed, serving base station 210(1) to an unlicensed, neighbor base station 210(2);
- Transitions from an unlicensed, serving base station 210(1) to an unlicensed, neighbor access point 210(2);
- Transitions from an unlicensed, serving access point 210(1) to a licensed, neighbor base station 210(2);
- Transitions from an unlicensed, serving access point 210(1) to an unlicensed, neighbor base station 210(2); and
- Transitions from an unlicensed, serving access point 210(1) to an unlicensed, neighbor access point 210(2).

As shown in FIG. 2, for each access node 210(*i*), the downlink coverage area 212(*i*) is larger than the uplink coverage area 214(*i*) due to the downlink signal strength as transmitted from that access node being greater than the uplink signal strength as transmitted from a UE. As such, there is an annular region 216(*i*) between the downlink and uplink coverage areas 212(*i*) and 214(*i*) where uplink communications from a UE to the corresponding access node 210(*i*) are not reliable, even though downlink communications from the access node 210(*i*) to the UE are reliable.

Note that, since the uplink signal strengths may vary from UE to UE, the uplink coverage areas 214(*i*) may be different for different UEs with respect to the same access node 210(*i*). Similarly, if the downlink-signal processing capabilities also vary from UE to UE, then the downlink coverage areas 212(*i*) may even be different for different UEs with respect to the same access node 210(*i*). Furthermore, if the uplink signal strengths and/or the downlink-signal processing capabilities vary over time for a given UE, then the uplink and/or downlink coverage areas 214(*i*) and 212(*i*) for that UE will also vary over time with respect to the same access node 210(*i*).

As known in the art, a UE periodically (i) measures different characteristics of the downlink signals received from its serving node and from its neighbor nodes and (ii) transmits, to its serving node, uplink measurement reports containing those measured characteristics along with a corresponding identifier for each access node. In particular, for downlink signals from a (licensed or unlicensed) 4G/5G base station, the uplink measurement reports may contain (without limitation) RSRP (reference signal received power) and/or SINR (signal-and-interference-to-noise ratio) measurements along with the PCI (physical cell identification number) of the base station. For downlink signals from a Wi-Fi access point, the uplink measurement reports may contain (without limitation) RSSI (received signal strength) and/or C/I (carrier-to-interference ratio) measurements along with the SSID (service set identifier) of the access point. In response to the successful receipt of each measurement report, the serving node transmits a downlink acknowledgement (ACK) message to the UE.

According to certain embodiments of the disclosure, a UE keeps track of (i) its transmission of uplink measurement reports to its serving node and (ii) its receipt of corresponding downlink ACK messages from that serving node.

In the particular scenario shown in FIG. 2, the UE 220 has recently moved from (i) a location (not shown in FIG. 2) within both the downlink coverage area 212(1) and the uplink coverage area 214(1) of its serving node 210(1) where both downlink and uplink communications were reliable to (ii) its current location (shown in FIG. 2) within the annular region 216(1) of its serving node 210(1), such that uplink communications to the serving node 210(1) are currently unreliable even though downlink communications from the serving node 210(1) are still reliable. As such, in FIG. 2, an uplink imbalance currently exists for the UE 220 with respect to the serving node 210(1).

In addition, in the scenario of FIG. 2, the UE 220 is currently located within both the downlink coverage area 212(2) and the uplink coverage area 214(2) of the neighbor node 210(2). As such, both uplink and downlink communications between the UE 220 and the neighbor node 210(2) would be reliable.

Depending on the particular implementation, either the UE 220 or the service provider's comm network (which includes the access nodes 210(1) and 210(2) of FIG. 2 and the backend network 130 of FIG. 1) (i) detects (i.e., determines the existence of) the uplink imbalance for the UE 220 with respect to its serving node 210(1) and (ii) initiates a transition (i.e., a handover) for the UE 220 from that serving node 210(1) to a neighbor node, in this case, the neighbor node 210(2).

When the UE 220 is located within the annular region 216(1) of FIG. 2, the downlink signals received from the serving node 210(1) are sufficiently strong for the UE 220 to reliably process downlink messages from the serving node 210(1), but the uplink signals from the UE 220 may be too weak for the serving node 210(1) to reliably process uplink messages from the UE 220. In other words, an uplink imbalance exists for the UE 220.

For implementations in which the UE 220 detects uplink imbalances, the UE 220 keeps track of the downlink ACK messages that it receives from its serving node 210(1) in response to its uplink measurement reports. If and when the UE 220 determines that it has failed to receive a specified number of ACK messages in a row (or a specified percentage of ACK messages for a specified number of recent uplink measurement reports), while the UE's measurements still indicate that the downlink signal strength from the serving node 210(1) is sufficiently strong, then the UE 220 detects an uplink imbalance and initiates handover processing by identifying the neighbor node (if any) having the greatest downlink received signal strength (greater than a specified minimum threshold level) measured at the UE to be the new serving node for the UE.

For implementations in which the comm network detects uplink imbalances, the comm network (e.g., the serving node 210(1)) keeps track of the uplink measurement reports that the serving node 210(1) successfully receives from the UE 220. If and when the comm network UE 220 determines that the serving node 210(1) has failed to receive a specified number of measurement reports in a row (or a specified percentage of measurement reports for a specified period of time), then the comm network detects an uplink imbalance for the UE 220 and initiates handover processing by identifying the neighbor node (if any) having the greatest downlink received signal strength (greater than a specified minimum threshold level) most recently measured at the UE and successfully reported to the serving node 210(1) to be the new serving node for the UE.

FIG. 3 is a message flow diagram (with time flowing from top to bottom) representing a scenario in which the UE 220 of FIG. 2 determines that it has an uplink imbalance with respect to the serving node (SN) 210(1) and initiates a transition to the neighbor node (NN) 210(2). In particular, in step 302, the UE 220 and the serving node 210(1) establish communications at a time when the UE 220 is located within the downlink and uplink coverage areas 212(1) and 214(1) of the serving node 210(1).

In step 304, the UE 220 transmits one of its periodic measurement reports containing measurements of downlink signals received by the UE 220 from the serving node 210(1) and any neighbor nodes (including neighbor node 210(2)), which measurement report is received and successfully processed by the serving node 210(1). In response, in step 306, the serving node 210(1) transmits an acknowledgement (ACK) message back to the UE 220. In step 308, the UE 220 transmits and the serving node 210(1) successfully receives another measurement report and, in step 310, the serving node 210(1) transmits another ACK message back to the UE 220.

By the time the UE 220 transmits another measurement report in step 312, the UE 220 has moved into the serving node's annular region 216(1), as shown in FIG. 2. Because uplink communications to the serving node 210(1) are not reliable for the UE 220 located within the annular region 216(1), the serving node 210(1) does not successfully receive the measurement report of step 312. As such, the serving node 210(1) does not transmit—and the UE 220 does not receive—an ACK message in response to the measurement report of step 312. This pattern of the UE 220 transmitting measurement reports and not receiving corresponding ACK messages is repeated a number of times, as represented in FIG. 3 by steps 312 through 314. Although not represented in FIG. 3, during this same time period, the UE 220 may continue to receive other, reliable downlink signals from the serving node 210(1).

When the UE 220 recognizes that it has failed to receive a specified number of ACK message in a row (or, alternatively, failed to receive a certain percentage of ACK messages over a specified time period), while still possibly receiving other, reliable downlink signals from the serving node 210(1), in step 316, the UE 220 determines that an uplink imbalance exists and initiates a transition to the neighbor node (if any) having the best downlink signal (e.g., strongest received signal strength). In this scenario, that neighbor node is the neighbor node 210(2).

In that case, in step 318, the UE 220 transmits to the neighbor node 210(2) a request to communicate, thereby triggering a handover from the serving node 210(1) to the neighbor node 210(2). In response, in step 320, the neighbor node 210(2) and the serving node 210(1) communicate via the backend network 130 to perform authentication and network validation processing associated with the transition (i.e., handover) from the serving node 210(1) to the neighbor node 210(2). When that processing is completed, in step 322, the neighbor node 210(2) transmits a message to the UE 220 informing the UE 220 that the neighbor node 210(2) is prepared to accept communications from the UE 220. In step 324, the serving node 210(1) confirms the handover by transmitting to the UE 220 the identity of the neighbor node 210(2) (e.g., a PCI (physical cell identifier) if the neighbor node 210(2) is a 4G/5G base station and an SSID (service set identifier) if the neighbor node 210(2) is a Wi-Fi access point).

In step 326, the neighbor node 210(2) transmits instructions that enable the UE 220 to process downlink messages from the neighbor node 210(2). If the neighbor node 210(2) is a 4G/5G base station, then, in step 326, the UE 220 decodes a Master Information Block (MIB), System Information Blocks (SIB), and Downlink Control Information (DCI)). If the neighbor node 210(2) is a Wi-Fi access point, then, in step 326, the UE 220 decodes RSSI and SINR (signal to interference and noise ratio). In step 328, the UE 220 transmits random access requests (as needed) to the neighbor node 210(2). Step 330 represents the UE 220 determining the completion of the handover from the serving node 210(1) to the neighbor node 210(2) as the new serving node.

FIG. 4 is a message flow diagram (with time flowing from top to bottom) representing a scenario in which (i) the comm network (e.g., serving node (SN) 210(1)) determines that the UE 220 has an uplink imbalance with respect to the serving node 210(1) and (ii) the comm network initiates a transition to the neighbor node (NN) 210(2). Steps 402-410 of FIG. 4 are the same as steps 302-310 of FIG. 3.

Following step 410, because the UE 220 is now located within the annular region 216(1) of the serving node 210(1), the serving node 210(1) cannot reliably receive measurement reports transmitted by the UE 220. As a result, in step 416, the comm network (i) determines that an uplink imbalance exists for the UE 220 by recognizing that the serving node 210(1) has failed to receive a specified number of expected measurement reports in a row (or, alternatively, failed to receive a certain percentage of measurement reports over a specified time period) and (ii) initiates a transition for the UE 220 to a neighbor node by identifying the neighbor node having the best downlink signal (e.g., strongest RSS). In this scenario, that neighbor node is the neighbor node 210(2).

In that case, in step 418, the serving node 210(1) communicates with the neighbor node 210(2) via the backend network 130 to trigger the handover of the UE 220 from the serving node 210(1) to the neighbor node 210(2). After the authentication and validation processing of step 420, in step 422, the neighbor node 210(2) informs the serving node 210(1) that the neighbor node 210(2) is ready to communicate with the UE 220. In step 424, the serving node 210(1) informs the UE 220 that the neighbor node 210(2) is to be the new serving node for the UE 220. From then on, steps 426-430 of FIG. 4 are identical to steps 326-330 of FIG. 3.

FIG. 5 is a simplified hardware block diagram of an example element 500 that can be used to implement any of the elements of FIGS. 1-4 including the UE 220 and the access nodes. As shown in FIG. 5, the element 500 includes (i) communication hardware (e.g., wireless, wireline, and/or optical transceivers (TRX)) 502 that supports communications with other elements, (ii) a processor (e.g., CPU microprocessor) 504 that controls the operations of the element 500, and (iii) a memory (e.g., RAM, ROM) 506 that stores code executed by the processor 504 and/or data generated and/or received by the element 500.

Although the present disclosure has been described in the context of implementations in which uplink imbalances are detected based on the transmission and receipt of measurement reports and/or the transmission and receipt of corresponding ACK messages, the present disclosure is not so limited. For example, uplink imbalances can also be detected by the network maintaining and aggregating network performance counters for individual UEs to generate key performance indicators (KPIs) from base station logs or element management systems (EMSs). For example, all base stations may be connected to an EMS of the backend network 130, which maintains and uses performance measurement (PM) counters, fault management (FM) or alarms data, and configuration management (CM) data to generate KPIs. PM counters may be aggregated upon specific conditions or intervals such as (without exception) 15 minutes, 60 minutes, or 24 hours, to generate KPIs. For example, a particular PM may be attempted multiple times over a 15-minute interval for a particular UE, where the success rate percentage for that PM is [(success_cnt/attempt_cnt)*100], where attempt_cnt is the number attempts at measuring the PM for the UE over a 15-minute period, and success_cnt is the number of times that the PM for the UE was successfully completed. If the success rate is less than a specified threshold percentage, then an uplink imbalance is detected. Uplink imbalances can be detected when the alarms are being triggered in specific conditions from base station providers.

In certain embodiments of the present disclosure, a wireless device comprises a wireless transceiver and a processor configured to control the wireless transceiver to cause the wireless device to communicate with a serving node; detect an uplink imbalance in communications between the serving node and the wireless device; and based on the detecting, initiate a transition for the wireless device to communicate with a neighbor node as a new serving node.

In at least some of the above embodiments, the serving node is a base station or an access point and the neighbor node is a base station or an access point.

In at least some of the above embodiments, the serving node is a licensed or unlicensed node and the neighbor node is a licensed or unlicensed node.

In at least some of the above embodiments, the wireless device is configured to detect the uplink imbalance based on failure to receive one or more acknowledgement messages from the serving node in response to the wireless device transmitting measurement reports to the serving node.

In at least some of the above embodiments, the wireless device is further configured to measure downlink signal strengths of two or more neighbor nodes and select the neighbor node having greatest downlink signal strength as the new serving node.

In certain embodiments of the present disclosure, a wireless network comprises a wireless transceiver and a processor configured to control the wireless transceiver to cause the wireless network to communicate with a wireless device via a serving node of the wireless network; detect an uplink imbalance in communications between the serving node and the wireless device; and based on the detected uplink imbalance, initiate a transition for the wireless device to communicate with a neighbor node of the wireless network as a new serving node.

In at least some of the above embodiments, the serving node is a base station or an access point and the neighbor node is a base station or an access point.

In at least some of the above embodiments, the serving node is a licensed or unlicensed node; and the neighbor node is a licensed or unlicensed node.

In at least some of the above embodiments, the wireless network is configured to detect the uplink imbalance based on failure to receive one or more measurement reports from the wireless device.

In at least some of the above embodiments, the wireless network is further configured to receive measured downlink signal strengths of two or more neighbor nodes from the wireless device and select the neighbor node having greatest downlink signal strength as the new serving node.

Unless explicitly stated otherwise, each numerical value and range should be interpreted as being approximate as if the word "about" or "approximately" preceded the value or range.

The use of figure numbers and/or figure reference labels in the claims is intended to identify one or more possible embodiments of the claimed subject matter in order to facilitate the interpretation of the claims. Such use is not to be construed as necessarily limiting the scope of those claims to the embodiments shown in the corresponding figures.

Although the elements in the following method claims, if any, are recited in a particular sequence with corresponding labeling, unless the claim recitations otherwise imply a particular sequence for implementing some or all of those elements, those elements are not necessarily intended to be limited to being implemented in that particular sequence. Likewise, additional steps may be included in such methods, and certain steps may be omitted or combined, in methods consistent with various embodiments of the disclosure.

Reference herein to "one embodiment" or "an embodiment" means that a particular feature, structure, or characteristic described in connection with the embodiment can be included in at least one embodiment of the disclosure. The appearances of the phrase "in one embodiment" in various places in the specification are not necessarily all referring to the same embodiment, nor are separate or alternative embodiments necessarily mutually exclusive of other embodiments. The same applies to the term "implementation."

Unless otherwise specified herein, the use of the ordinal adjectives "first," "second," "third," etc., to refer to an object of a plurality of like objects merely indicates that different instances of such like objects are being referred to, and is not intended to imply that the like objects so referred-to have to be in a corresponding order or sequence, either temporally, spatially, in ranking, or in any other manner.

Also for purposes of this description, the terms "couple," "coupling," "coupled," "connect," "connecting," or "connected" refer to any manner known in the art or later developed in which energy is allowed to be transferred between two or more elements, and the interposition of one or more additional elements is contemplated, although not required. Conversely, the terms "directly coupled," "directly connected," etc., imply the absence of such additional elements. The same type of distinction applies to the use of terms "attached" and "directly attached," as applied to a description of a physical structure. For example, a relatively thin layer of adhesive or other suitable binder can be used to implement such "direct attachment" of the two corresponding components in such physical structure.

The described embodiments are to be considered in all respects as only illustrative and not restrictive. In particular, the scope of the disclosure is indicated by the appended claims rather than by the description and figures herein. All changes that come within the meaning and range of equivalency of the claims are to be embraced within their scope.

The functions of the various elements shown in the figures, including any functional blocks labeled as "processors" and/or "controllers," may be provided through the use of dedicated hardware as well as hardware capable of executing software in association with appropriate software. Upon being provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those of ordinary skill in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

As will be appreciated by one of ordinary skill in the art, the present disclosure may be embodied as an apparatus (including, for example, a system, a network, a machine, a device, a computer program product, and/or the like), as a method (including, for example, a business process, a computer-implemented process, and/or the like), or as any combination of the foregoing. Accordingly, embodiments of the present disclosure may take the form of an entirely software-based embodiment (including firmware, resident software, micro-code, and the like), an entirely hardware embodiment, or an embodiment combining software and hardware aspects that may generally be referred to herein as a "system" or "network".

Embodiments of the disclosure can be manifest in the form of methods and apparatuses for practicing those methods. Embodiments of the disclosure can also be manifest in the form of program code embodied in tangible media, such as magnetic recording media, optical recording media, solid state memory, floppy diskettes, CD-ROMs, hard drives, or any other non-transitory machine-readable storage medium, wherein, upon the program code being loaded into and executed by a machine, such as a computer, the machine becomes an apparatus for practicing the disclosure. Embodiments of the disclosure can also be manifest in the form of program code, for example, stored in a non-transitory machine-readable storage medium including being loaded into and/or executed by a machine, wherein, upon the program code being loaded into and executed by a machine, such as a computer, the machine becomes an apparatus for practicing the disclosure. Upon being implemented on a general-purpose processor, the program code segments combine with the processor to provide a unique device that operates analogously to specific logic circuits. The term "non-transitory," as used herein, is a limitation of the medium itself (i.e., tangible, not a signal) as opposed to a limitation on data storage persistency (e.g., RAM vs. ROM).

In this specification including any claims, the term "each" may be used to refer to one or more specified characteristics of a plurality of previously recited elements or steps. When used with the open-ended term "comprising," the recitation of the term "each" does not exclude additional, unrecited elements or steps. Thus, it will be understood that an apparatus may have additional, unrecited elements and a method may have additional, unrecited steps, where the additional, unrecited elements or steps do not have the one or more specified characteristics.

As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements. For example, the phrases "at least one of A and B" and "at least one of A or B" are both to be interpreted to have the same meaning, encompassing the following three possibilities: 1—only A; 2—only B; 3—both A and B.

The embodiments covered by the claims in this application are limited to embodiments that (1) are enabled by this specification and (2) correspond to statutory subject matter. Non-enabled embodiments and embodiments that correspond to non-statutory subject matter are explicitly disclaimed even if they fall within the scope of the claims.

As used herein and in the claims, the term "provide" with respect to an apparatus or with respect to a system, device, or component encompasses designing or fabricating the apparatus, system, device, or component; causing the apparatus, system, device, or component to be designed or fabricated; and/or obtaining the apparatus, system, device, or component by purchase, lease, rental, or other contractual arrangement.

While preferred embodiments of the disclosure have been shown and described herein, it will be obvious to those skilled in the art that such embodiments are provided by way of example only. Numerous variations, changes, and substitutions will now occur to those skilled in the art without departing from the disclosure. It should be understood that various alternatives to the embodiments of the disclosure described herein may be employed in practicing the technology of the disclosure. It is intended that the following claims define the scope of the invention and that methods and structures within the scope of these claims and their equivalents be covered thereby.

What is claimed is:

1. A method for an apparatus, the method comprising:

the apparatus communicating with a serving node of a wireless network;

the apparatus detecting an uplink imbalance in communications between the serving node and a wireless device of the wireless network; and based on the detecting, the apparatus initiating a transition for the wireless device to communicate with a neighbor node of the wireless network as a new serving node, wherein the apparatus is the wireless device, which detects the uplink imbalance based on failure to receive one or more acknowledgement messages from the serving node in response to the wireless device transmitting measurement reports to the serving node.

2. The method of claim 1, wherein:

the serving node is a base station or an access point; and the neighbor node is a base station or an access point.

3. The method of claim 1, wherein:

the serving node is a licensed or unlicensed node; and the neighbor node is a licensed or unlicensed node.

4. The method of claim 1, further comprising the wireless device:

measuring downlink signal strengths of two or more neighbor nodes; and selecting the neighbor node having greatest downlink signal strength as the new serving node.

5. An apparatus comprising a wireless transceiver and a processor configured to control the wireless transceiver to cause the apparatus to:

communicate with a serving node of a wireless network;

detect an uplink imbalance in communications between the serving node and a wireless device of the wireless network; and based on the detecting, initiate a transition for the wireless device to communicate with a neighbor node as a new serving node, wherein the apparatus is the wireless device, which is configured to detect the uplink imbalance based on failure to receive one or more acknowledgement messages from the serving node in response to the wireless device transmitting measurement reports to the serving node.

6. The apparatus of claim 5, wherein:

the serving node is a base station or an access point; and the neighbor node is a base station or an access point.

7. The apparatus of claim 5, wherein:

the serving node is a licensed or unlicensed node; and the neighbor node is a licensed or unlicensed node.

8. The apparatus of claim 5, wherein the wireless device is further configured to:

measure downlink signal strengths of two or more neighbor nodes; and select the neighbor node having greatest downlink signal strength as the new serving node.

* * * * *